United States Patent [19]

Compton

[11] Patent Number: 4,796,099

[45] Date of Patent: Jan. 3, 1989

[54] VIDEO STILL PLAYER WITH INTERNAL CAPABILITY FOR EXECUTING EXTERNALLY-GENERATED VIEWING PROGRAMS

[75] Inventor: John T. Compton, Leroy, N.Y.

[73] Assignee: Eastman Kodak Company, Rochester, N.Y.

[21] Appl. No.: 855,251

[22] Filed: Apr. 24, 1986

[51] Int. Cl.⁴ ............................................. H04N 5/781
[52] U.S. Cl. .................................... 358/342; 358/335; 360/35.1; 369/32
[58] Field of Search ................... 358/335, 342, 903; 369/30, 32, 36, 38, 34; 360/14.1, 35.1; 364/900

[56] References Cited

U.S. PATENT DOCUMENTS

| | | | |
|---|---|---|---|
| 3,990,710 | 11/1976 | Hughes | 369/30 X |
| 4,115,819 | 9/1978 | Shigeta | 360/14.1 |
| 4,222,574 | 9/1980 | Cheeseboro | 369/30 |
| 4,272,790 | 6/1981 | Bates | 360/14.1 |
| 4,355,332 | 10/1982 | Beeson | 360/14.1 |
| 4,394,745 | 7/1983 | Menezes et al. | 364/900 |
| 4,422,105 | 12/1983 | Rodesch et al. | 358/903 |
| 4,425,586 | 6/1984 | Miller | 358/335 |
| 4,428,001 | 1/1984 | Yamamura et al. | 358/335 |
| 4,449,198 | 5/1984 | Kroon et al. | 364/900 |
| 4,490,810 | 12/1984 | Hon | 364/900 |
| 4,492,582 | 1/1985 | Chang et al. | |
| 4,511,970 | 4/1985 | Okano et al. | 364/401 |
| 4,519,002 | 5/1985 | Amano | 358/335 |
| 4,519,003 | 5/1985 | Scholz | 358/335 |
| 4,527,250 | 7/1985 | Galdun et al. | 364/900 |
| 4,530,009 | 7/1985 | Mizokawa | 358/903 X |
| 4,531,740 | 7/1985 | Green et al. | 273/148 B |
| 4,534,013 | 8/1985 | Sheth | 364/900 |
| 4,538,176 | 8/1985 | Nakajima et al. | 358/86 |
| 4,539,663 | 9/1985 | Ishibashi et al. | |
| 4,568,161 | 2/1986 | DiGianfilippo et al. | |
| 4,594,700 | 6/1986 | Takahashi et al. | 369/36 X |
| 4,599,716 | 7/1986 | Shimbo | 369/36 |
| 4,630,231 | 12/1986 | Hirata et al. | 364/900 |
| 4,652,939 | 3/1987 | Baumeister | 369/38 X |
| 4,660,101 | 4/1987 | Martin | 360/35.1 X |
| 4,675,755 | 6/1987 | Baumeister et al. | 360/35.1 |
| 4,685,001 | 8/1987 | Martin | 358/342 |

FOREIGN PATENT DOCUMENTS

| | | |
|---|---|---|
| 2540322 | 8/1984 | France . |
| 86/01631 | 3/1986 | PCT Int'l Appl. . |
| 2064260 | 6/1981 | United Kingdom . |
| 2103410 | 2/1983 | United Kingdom . |
| 2113887 | 8/1983 | United Kingdom . |

OTHER PUBLICATIONS

Cavanagh, R. T., "Educational/Institutional Features of the Optical Videodisc System", SMPTE Journal, vol. 86, No 4, 4/77, pp. 201-203.

Primary Examiner—Robert L. Richardson
Assistant Examiner—W. R. Young
Attorney, Agent, or Firm—David M. Woods

[57] ABSTRACT

A video still player enhances its picture display capability by buffering a vulnerable channel through which viewer instructions enter the player. Ordinary viewer instructions pass over a relatively direct input channel linking a keyboard and a remote storage device, but one nonetheless defined and safeguarded by a strict editing routine. Enhanced picture processing ordinarily entails difficult and unstructured access to the storage device over this channel, bypassing the "user friendly" editing routine and endangering prepared programs in the remote storage device. By automatically interposing an external compiler into this channel when enhanced processing is initiated, special picture displays can be generated without jeopardizing the integrity of the player.

9 Claims, 6 Drawing Sheets

FIG. 2A
(PRIOR ART)
FIG. 2B
(PRIOR ART)
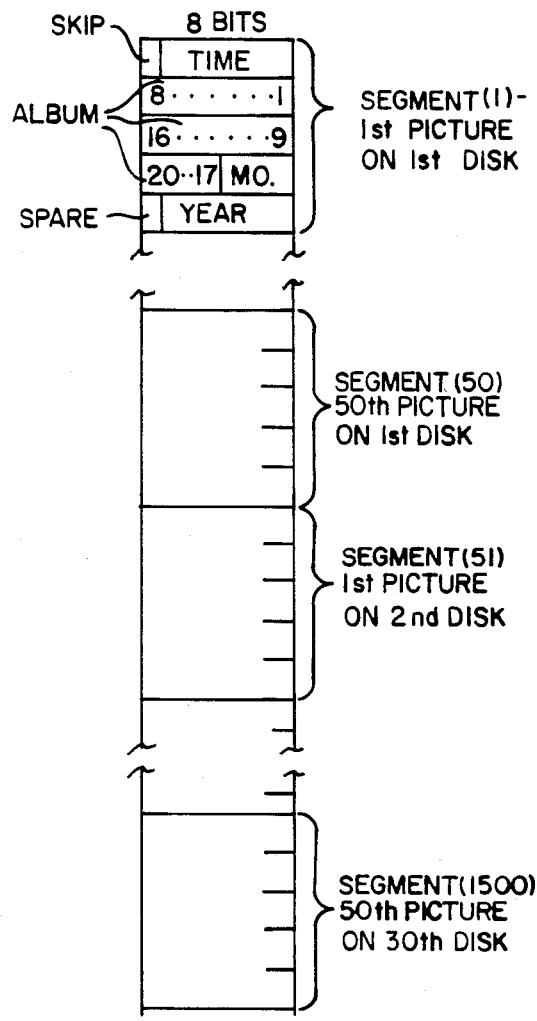
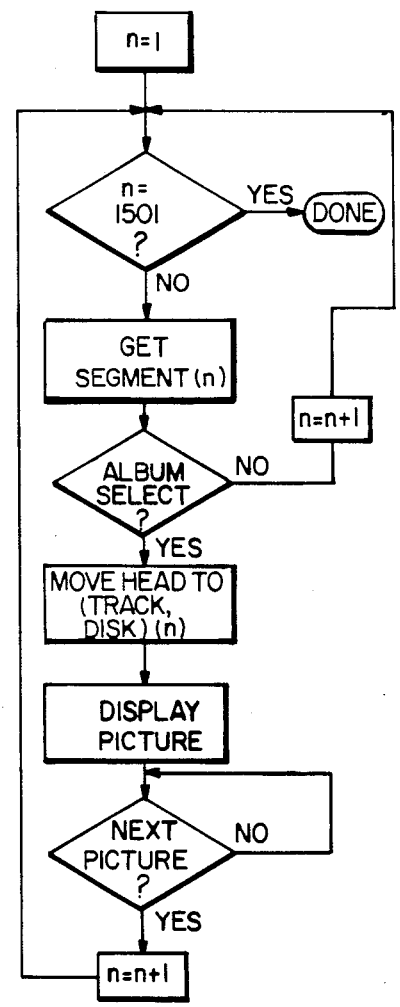

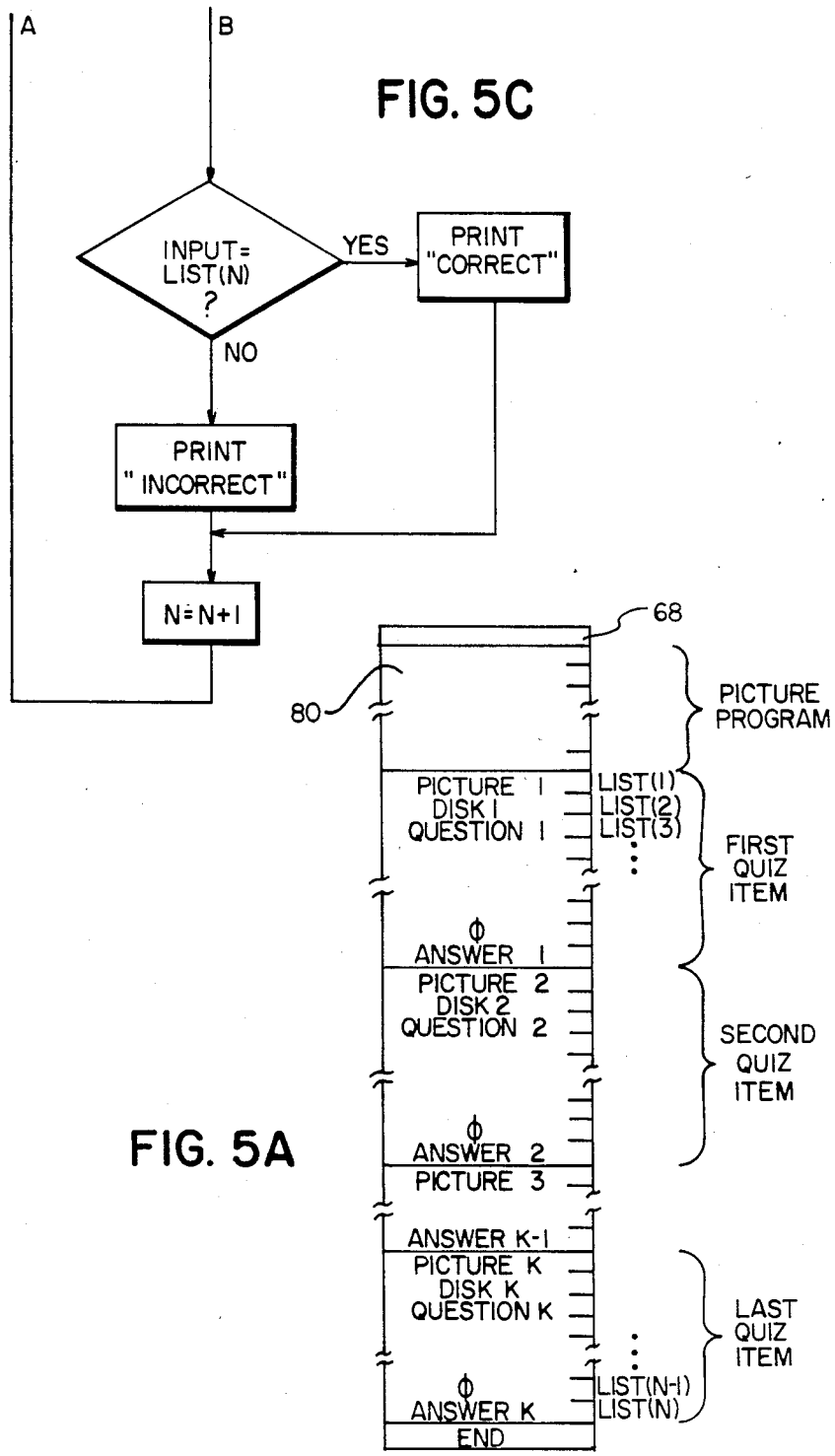

VIDEO STILL PLAYER WITH INTERNAL CAPABILITY FOR EXECUTING EXTERNALLY-GENERATED VIEWING PROGRAMS

BACKGROUND OF THE INVENTION

Field of the Invention

The invention relates to a video still player capable of playing back pictures prerecorded on a plurality of video disks contained in a removable magazine and, in particular, to a video player of this type that is further capable of generating and storing an arrangement for viewing the pictures.

BRIEF DESCRIPTION OF THE DRAWINGS

The prior art and the invention will be described with reference to the drawings, in which:

FIGS. 2A and 2B show a known memory layout and a flow chart describing a known function performed by the video player of FIG. 1;

FIG. 5A shows a memory layout and FIGS. 5B and 5C show a flow chart of an interactive playback function performed by the video player of FIG. 3.

DESCRIPTION RELATIVE TO THE PRIOR ART

Figure 1:
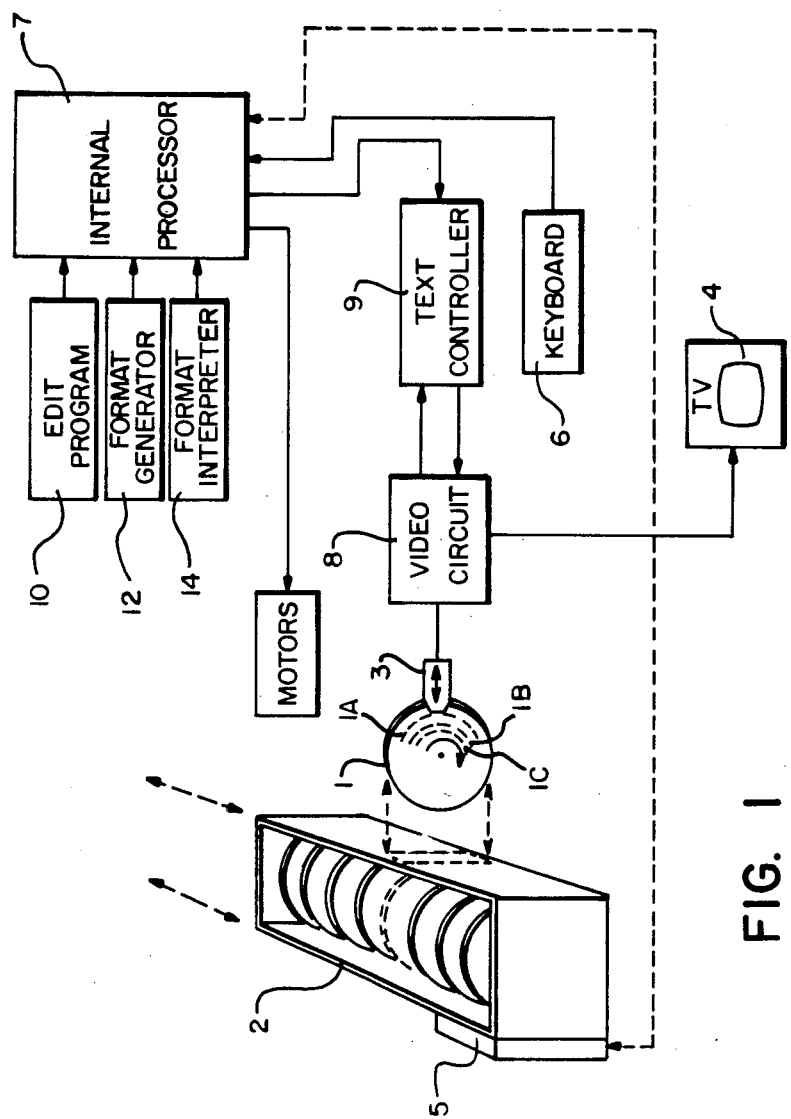
FIG. 1 is a block diagram of a known video player of the type that generates and stores an arrangement for viewing pictures.

The invention is useful with the type of video player described in detail in related patent application Ser. No. 644,096 now U.S. Pat. No. 4,675,755, entitled "Video Disk Apparatus Providing Organized Picture Playback," filed Aug. 24, 1984 and assigned to the present assignee. In a known player of this type shown schematically by FIG. 1, a video disk 1 has been removed from a video disk magazine 2 containing, for example, thirty such disks. Each disk contains up to fifty concentric video tracks 1A, 1B, 1C . . . , each storing one picture (one video field). A playback head 3 is adjacent one of these tracks. The player reproduces a selected set (album) of pictures on a television display 4 by retrieving the pictures according to a particular viewing arrangement involving one or more of the disks. The viewing arrangement provides for several, say twenty, albums of like image content.

The data establishing this viewing arrangement is initially obtained by editing the pictures, that is, by assigning some of the pictures to one or more albums. Editing follows a strict procedure governed by an internal processor 7 and its edit program 10. The viewer observes editing "screens" on the television display 4, which require predetermined types of responses, and then enters the responses through a keyboard 6. The fixed responses given to the editing "screens" are transformed into fixed format data segments by a format generator 12 and stored in a remote memory 5 according to the memory layout shown by FIG. 2A. The remote memory 5 is attached to the magazine 2, and so remains even when the magazine 2 is removed from the player.

In viewing an album, the magazine 2 is inserted into the aforementioned player (or any like player) and the remote memory 5 is connected to the internal processor 7. One of the albums is selected and the pictures are automatically obtained by accessing the disks, and the picture tracks on the disks, in the sequence dictated by the particular album data. The data is withdrawn from the memory 5 one segment after another and translated into machine commands by a format interpreter 14. The display signal to the television display 4 is provided by a video circuit 8 that switches between a picture signal from the head 3 and a text signal from a text controller 9, which also generates the aforementioned editing "screens" according to programs contained in the edit program 10. FIG. 2B shows a typical flow diagram for the sequential retrieval of pictures for a given album as performed by the format interpreter 14.

Though the segment-oriented remote memory, and the sequential processing it entails, is quite sufficient for a majority of consumer applications, there are significant limitations. It only allows for forward viewing, that is, viewing (within each album) one assigned picture after another in the sequence they appear on the disks in the magazine. Because the format is fixed, there is no provision for the type of enhanced capability that might please specific users, like random picture access, text annotation, interactive access (based on viewer responses to queries), and the like. Despite the strict editing procedure, it is readily conceivable that a skilled viewer could bypass the editing program 10 and the format generator 12 and enter instructions from the keyboard 6 directly into the remote memory 5. Such direct entry is attractive because the viewer could generate a custom picture display program. It is, however, confusing and tedious for the ordinary viewer especially when the instructions have to be entered in hexadecimal code to specific memory addresses.

More importantly, such unstructured access to the remote memory 5 bypasses the safeguards provided by the strict editing procedure and jeopardizes not only existing viewing arrangements but the "user friendliness" of the machine itself. The remote memory 5 is designed to contain specific album viewing arrangements according to the specific format heretofore mentioned. Any direct access by the user could easily damage the existing data, without any more benefit than a difficult and obtuse way of generating a custom display program. These problems are compounded by the portability of the magazine 2 and its remote memory 5. That is, the viewing arrangement that is compromised may have been the hard work of someone else, even using another player. The problem comes down to the fact that the player is basically set up to prepare only one type of picture viewing arrangement . . . which is stored separate from the player in the remote memory 5. Any other kind of access to the remote memory 5 is basically unstructured and vulnerable to the above-noted difficulties.

SUMMARY OF THE INVENTION

The problems created by unstructured direct access to the remote memory can be alleviated by buffering the data input channel . . . from the internal keyboard to the remote memory . . . with an external compiler. By intercepting viewer instructions from the keyboard and converting them into specialized statements, the compiler provides a customized picture viewing program that does not endanger either existing programs or the "user friendliness" of the machine. The viewer instructions are redirected through an external port on the player and converted by the compiler into a set of program instructions . . . a picture program . . . that is downloaded through the external port to the remote memory. A special picture program interpreter is provided as part of the video player for executing these specialized instructions. Since all that is necessary to operate the player . . . especially the picture program and the interpreter . . . is now available within the player, the customized viewing arrangement may be generated though the external compiler is detached from the player. The player thus recovers its initial portability though its self-contained picture program now exceeds its initial capability.

A video player system according to the invention effectively substitutes the external compiler for the internal format generator when a customized viewing arrangement is signified. The external port, when connected to the external compiler, automatically initiates the redirection of viewer instructions from the keyboard to the external compiler. The compiler operates in conjunction with an external processor, which may possess incidental processing capability in excess of the internal processor. The viewer instructions handled in this way can, for example, generate a program for retrieving disks, and pictures within disks, in any randomized sequence.

DETAILED DESCRIPTION OF A PREFERRED EMBODIMENT

Figure 3:
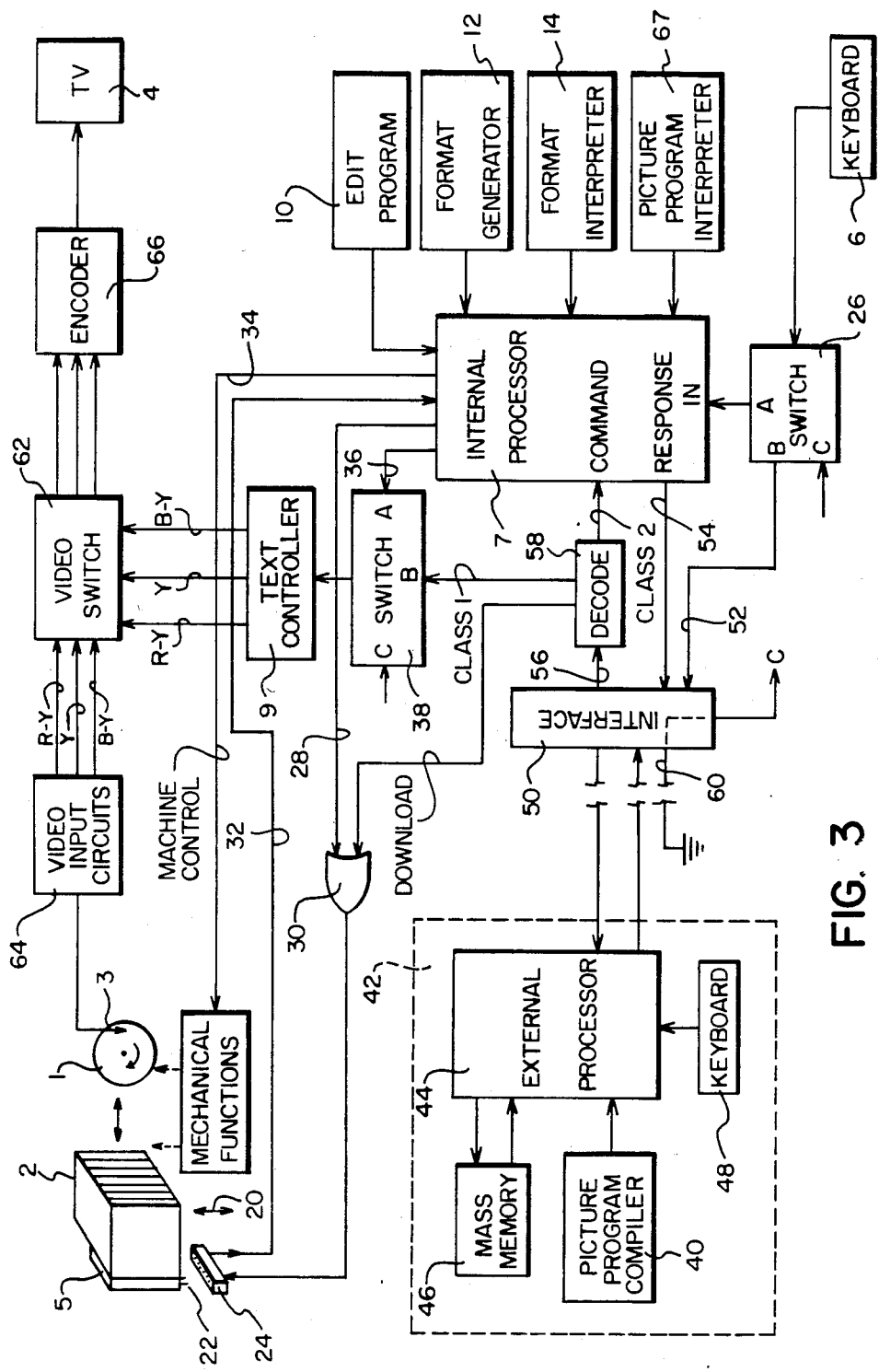
FIG. 3 is a block diagram of a video player that incorporates an external picture program compiler according to the invention.

A video player system including an enhanced picture display capability according to the invention is shown by FIG. 3. The magazine 2, which is removable from the player as shown by an arrow 20, includes the aforementioned remote memory 5, which contains one or more conventional erasable, programmable memory elements. When fully inserted into the player, a set of connectors 22 on the memory 5 engages the stationary socket 24. A circuit path is thereupon provided between the remote memory 5 and the internal processor 7. In the basic mode of player operation, viewer instructions from the keyboard 6, which are prompted by the edit "screens" generated by the edit program 10, enter the processor 7 via a software switch 26. The viewer instructions are converted by the format generator 12 into five-byte segments for each picture as shown in connection with FIG. 2A. If twenty albums are possible, one bit in each segment (20 bits total) will indicate whether a picture belongs to a given album. Other bits have other meanings based on their position in the segment, i.e., whether to skip a picture, add the date, or provide an elapsed time for automatic viewing. When editing is completed, the segments form a data base through which the processor will sequentially step, determining from one segment after the other whether a picture belongs to a selected album.

The formatted segments are sent on a line 28 through an OR gate 30 to the remote memory 5. When an album is to be viewed, the stored data segments are sequentially accessed on a line 32 under control of the internal processor 7. Each segment is decoded as to its position assignments by the format interpreter 14. The condition of each bit position in the five-byte string initiates appropriate machine control instructions on a line 34, i.e., for removing a particular disk, for sequencing the head through particular tracks, and for establishing a viewing time. If the viewing arrangement stored in the remote memory 5 calls for the addition of year and date to the picture, the corresponding text signal is sent on a line 36 through a software switch 38 to the aforementioned text controller 9.

The basic mode of operation described to this point is a forward-looking, sequential procedure that is inadequate for specialized applications involving, for example, random picture access. The segment format, in addition, does not allow extensive text annotation of the pictures. In accordance with the invention, the basic capability of the player is enhanced by interposing an external picture program compiler 40 in the data input link to the remote memory 5. The compiler 40 is part of an external assembly 42 which includes an external processor 44, a mass memory device 46 and a keyboard 48. The external assembly 42 substitutes for certain functions, particularly relating to data input, provided by the internal processor 7 and its associated edit program 10 and format generator 12. The picture program compiler 40 generates a special picture program providing specialized instructions for a customized viewing arrangement (for example, allowing random picture access). The special picture program is downloaded by the external processor 44 to the remote memory 5. In this way the external assembly 42 becomes part of an expanded player system.

The connection between the external assembly 42 and the basic player is effected by an external interface port 50. Outgoing data from the player enters the port 50 either from the software switch 26 on a line 52 or from the internal processor 7 on a line 54. Returning data is directed on a line 56 to a decode module 58, which separates a downloaded program from ASCII characters (class 1) and machine commands (class 2). The downloaded program data is directed from the decoder module 58 to the OR gate 30 and therefrom to the remote memory 5. Class 2 messages relate to an operation under control of the internal processor 7 and require a response back to the external processor 44 when the operation is completed. Class 1 ASCII character data, which does not require a response, is communicated directly to the software switch 38 and therefrom to the text controller 9.

The connection between the external port 50 and the external assembly 42 also completes a ground jumper on a line 60 which causes the generation of a switching signal C. The switches 26 and 38 receive the switching signal C, accordingly switching from data ports A to data ports B. (The switching may be preceded by an inquiry of the viewer as to shifting control to the external processor 44; a yes response would result in the actual switching.) This means that the connection of the external assembly 42 to the basic player automatically initiates the bypassing of the internal processor 7 in favor of a direct input route via the port 50 to the external processor 44. Likewise, at the input side, ASCII character data directed to the text controller 9 originates solely with the external processor 44 via the switch 38. Machine operations (class 2 messages) are also initiated by the external processor 44.

The text characters exit the text controller 9 as appropriate luminance and color difference signals Y, R-Y, and B-Y, which are provided to a video switch 62. The video signal, meanwhile, has been reproduced from the disk 1 as, typically, line sequential frequency-modulated information. The video signal is recovered in video input circuits 64, which include the usual preamplifiers, clamps, demodulators, and the like. The video switch in effect selects either picture video from the video input circuits 64 or text video from the text controller 9. The resulting video information is converted into, for example, a NTSC video signal by an encoder 66 and provided to the television display 4.

By buffering the data entry channel with the compiler 40, the fixed memory layout of FIG. 2A may be abandoned in favor of virtually anything the skilled user might desire in connection with a specific application. Ordinarily this will be done in conjunction with a predetermined programing language. For example, the picture program compiler 40 within the external assembly 42 is structured to respond to a programing language (entered as statements through either the keyboards 6 or 48) such as BASIC. The compiler 40 would typically include an edit program that, similar to the edit program 10, provides prompting screens for stepping the viewer through program entries. Once the picture program is downloaded into the remote memory 5, the external assembly 42 (including the compiler 40) may be detached from the external port 50. The player thus recovers its initial portability though the picture program it now exceeds its initial capability.

When the downloaded picture program is retrieved from the remote memory 5, it is decoded into machine instructions and text by a picture program interpreter 67 that is specially adapted for the picture program instructions. The interpreter 67 executes the program statements of the downloaded picture program, causing the internal processor 7 to operate the player according to the customized viewing arrangement. The actual structures of the compiler and the interpreter depend on the intended application and are within the ordinary design skill of one involved in such data processing arts. The compiler resides in the external assembly 42, which may be any conventional personal computer.

Figure 4A:
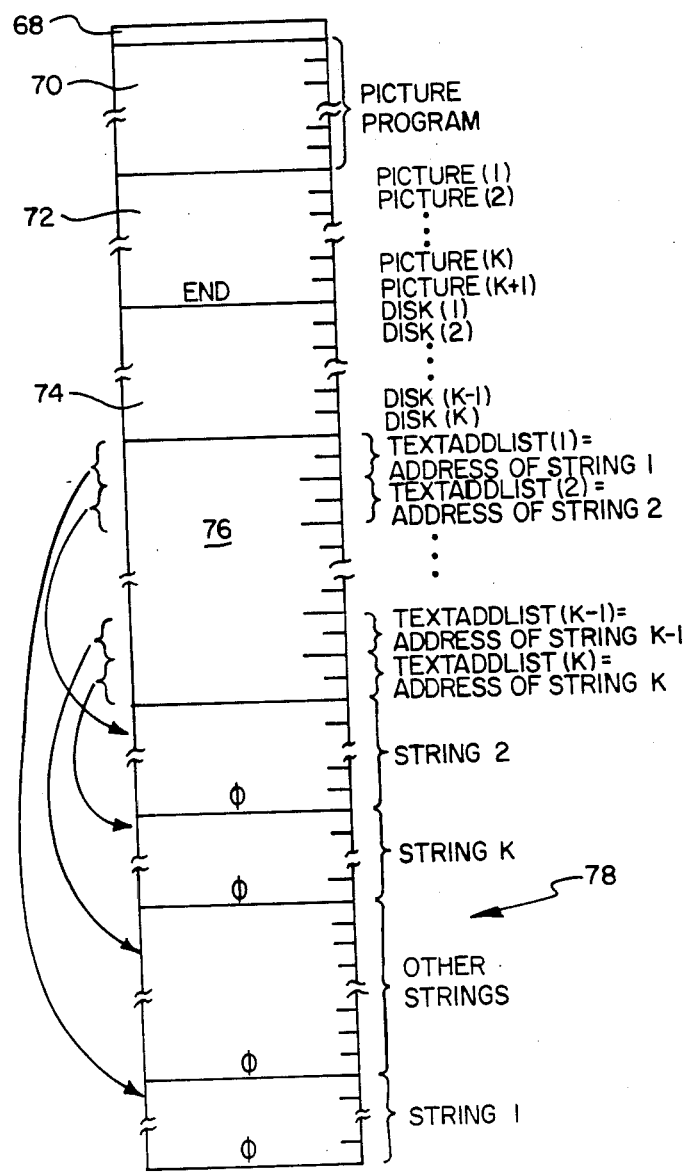
FIGS. 4A and 4B show a memory layout and a flow chart of a random access function performed by the video player of FIG. 3.
Figure 4B:
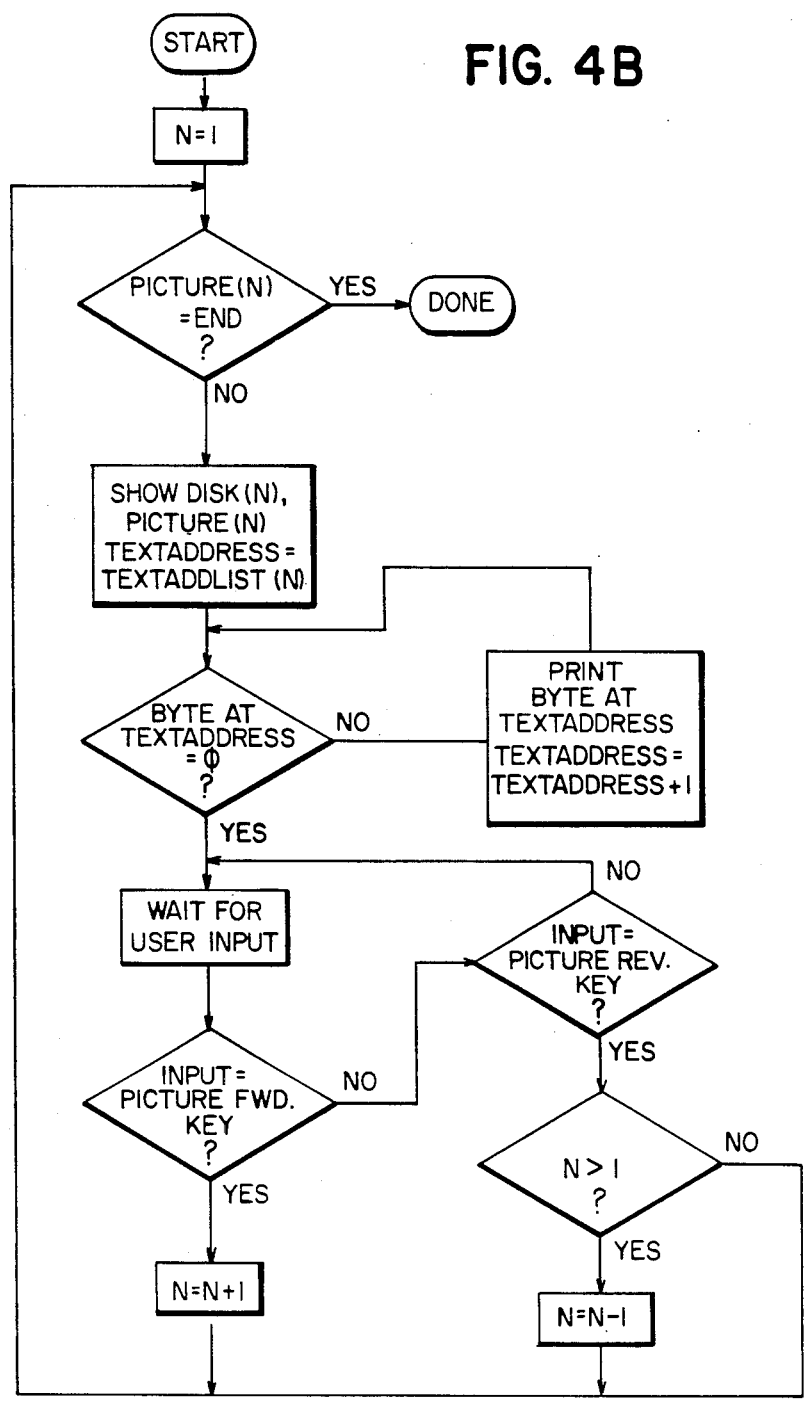

FIGS. 4 and 5 represent exemplary picture programs. The picture program embodied in the memory layout of FIG. 4A and the flow diagram of FIG. 4B enables a viewer to step forward or backward through a list of pictures; the order of the pictures in the list does not have any necessary relationship to the order of the pictures on a disk or disks in the magazine, i.e., picture access is random. Each picture is displayed with associated text. The fact that a certain area of the remote memory 5 has been allocated to a picture program is indicated by an identification byte 68. The condition of the identification byte 68 activates the picture program interpreter 67 (in lieu of the format interpreter 14). The picture program, which is generated by the compiler 40 and allocated to a memory location 70, contains the logic for determining how the remainder of the memory is addressed according to the flow diagram of FIG. 4B. The memory layout, keyed to a pointer (N), is a set of three different arrays—a picture array in a memory location 72, a disk array in a memory location 74, and an array of memory address pointers (in a location 76) and associated text strings (in a location 78). As shown by the flow diagram of FIG. 4B, the pointer (N) is incremented prior to each picture and disk retrieval. The subordinate text pointer (textaddlist (N)) points, as shown, to a particular string (1, . . . ,K) of variable length depending on the annotation. A viewer instruction signifying forward or reverse triggers corresponding movement through the memory (except that reverse is not permitted for N=1). When incrementing N finds picture (N)=end, the picture display stops.

Figure 5B:
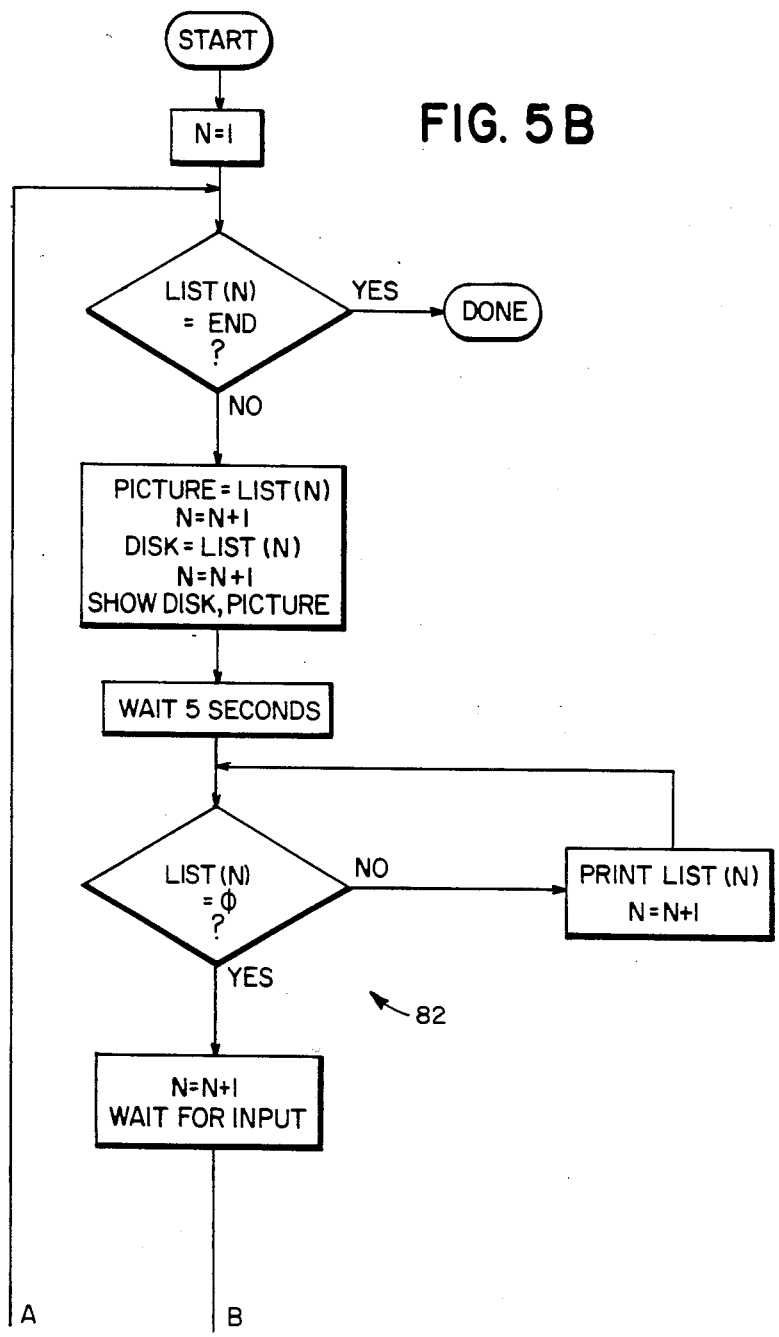

FIGS. 5A and 5B represent an interactive viewing program for a multiple choice quiz based on information related to the displayed pictures. By structuring the memory as shown by FIG. 5A, the picture program in a memory location 80 steps through the quiz items one after the other, pausing, as shown by FIG. 5B, to obtain responses from the viewer via the keyboard 6 (or 48). The list (N) acts as a pointer to increment the program. Each picture instruction (picture=list (N)) and disk instruction (disk=list (N)) is recovered and the indicated picture is displayed. Then the text is brought up character by character in the program section 82 until the character $\phi$ is reached, which signifies the end of the text. The flow is interrupted for a viewer input, at which time the response is compared to the answer and the appropriate encouragement is displayed. The pointer list (N) is again incremented, and the sequence repeats, until list (N)=end.

The invention has been described in detail with particular reference to a presently preferred embodiment, but it will be understood that variations and modifications can be effected within the spirit and scope of the invention. For example, the external assembly 42 (FIG. 3) includes a mass memory 46, which is typically a disk drive and the magnetic disks associated therewith. The mass memory 46 can be operated by the external processor 44 so as to save picture programs that have been generated by the viewer and either not written to the remote memory 5 or, if written, copied from the remote memory 5 prior to write-over with a new picture program.

What is claimed is:

1. In video player apparatus capable of playing back pictures recorded on a plurality of video disks contained in a removable magazine, the pictures being reproduced according to a viewing arrangement located in a programmable storage device attached to the magazine, the player apparatus including a keyboard unit for entering viewing data and an internal format generator for converting the viewing data into the viewing arrangement located in the storage device, the improvement wherein the player apparatus further comprises:
   means connectable with an external compiler for converting the viewing data into statements indicative of a customized viewing arrangement;
   means for substituting said external compiler for the internal format generator when a customized viewing arrangement is to be generated;
   means for downloading the statements generated by said external compiler to the programmable storage device;
   an interpreter resident in the player apparatus and operative irrespective of said external compiler connection for generating machine level instructions from the statements; and
   means for directing the statements stored by said programmable storage device to said interpreter so that the customized viewing arrangement is obtained without the assistance of said external compiler.

2. Apparatus as claimed in claim 1 in which the player further comprises an external port for connecting said compiler to the player and switching means for connecting the keyboard unit to either the internal format generator or to said external port, and wherein said substituting means comprises means for actuating said switching means to enable the connection between the keyboard unit and said external port when said compiler is connected to said external port.

3. Apparatus as claimed in claim 1 in which said external compiler is part of an external computer including an external processor, an external memory storage device, and an external keyboard.

4. Apparatus as claimed in claim 3 in which said external computer includes an editing program for initiating responses leading to a customized viewing arrangement, said responses being of a form acceptable to said external compiler.

5. In a video player system capable of playing back pictures from a plurality of magnetic disks according to viewing instructions contained in a programmable storage device attached to a removable magazine storing the disks, the player system including an internal processor for controlling player functions and a data entry unit for inputting data that forms the viewing instructions, the improvement wherein the video player system further comprises:
   an external processor;
   an external port for connecting the player to said external processor;
   a picture program compiler connected to said external processor for converting data from said data entry unit to a set of viewing instructions;
   means for downloading the viewing instructions into said programmable storage device; and
   an interpreter for generating machine instructions from the stored viewing instructions irrespective of the connnection of said external processor to said external port.

6. Apparatus as claimed in claim 5 wherein said external port includes means for signalling the player that said external processor is connected thereby initiating the direct transfer of data from the data entry unit to said external processor.

7. A video player for playing back pictures prerecorded upon a plurality of video disks stored in a removable magazine, the player including an internal processor and a data entry device for generating an arrangement for viewing selected pictures and for initiating the display of the pictures according to the viewing arrangement, the magazine including a storage device that contains memory space for the viewing arrangement and that connects with the internal processor when the magazine is used by the player, the player further including an external signal port for connecting an external processor to the player, the improvement wherein said video player further comprises:
   means for generating an enabling signal when the external processor is connected to the external signal port;
   means responsive to the enabling signal for routing data from the data entry device to the external signal port and therefrom to the external processor in lieu of the internal processor;
   means for receiving incoming data from the external processor via the external signal port;
   means for decoding the received data in order to recognize a downloaded program containing special program instructions that pertain to an arrangement for viewing the pictures;
   means for routing the downloaded program to the storage device associated with the magazine; and
   picture processing means for executing the special program instructions contained in the downloaded program.

8. Apparatus as claimed in claim 7 further including means coupling said picture processing means and said internal processor for accessing the downloaded program when the magazine is located in the player.

9. In a video player capable of reproducing pictures recorded on a plurality of video disks contained in a magazine, the pictures being reproduced according to a viewing arrangement located in a storage device attached to the magazine, the player further including an internal processor for operating the player and an external port for attaching an external compiler to the player, the improvement wherein the player further comprises:
   means for downloading custom program statements from the external compiler through the external port to the storage device;
   custom interpreter means cooperative with the internal processor for generating machine operating instructions from the custom program statements; and
   means for directing the custom program statements stored by said storage device to said custom interpreter means whereby the internal processor operates the player according the machine operating instructions and independently of the external compiler.

* * * * *